Figure 1:
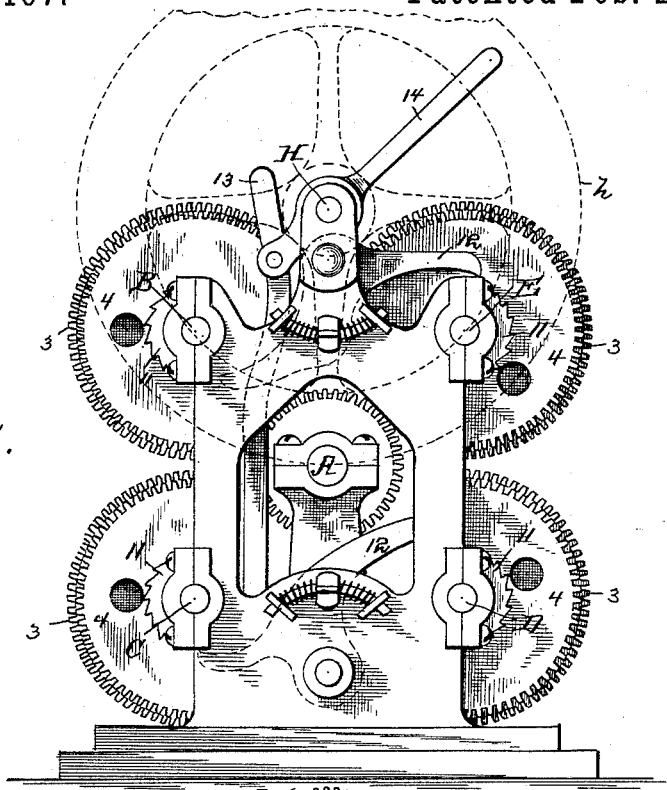

(No Model.) 4 Sheets—Sheet 1.
S. B. WORTMANN.
MECHANICAL MOVEMENT.

No. 468,167. Patented Feb. 2, 1892.

Witnesses:

Inventor:
S. B. Wortmann
By Edson Bros,
Attorneys (No Model.) 4 Sheets—Sheet 2.

S. B. WORTMANN.
MECHANICAL MOVEMENT.

No. 468,167. Patented Feb. 2, 1892.

Witnesses:

Inventor:

(No Model.) 4 Sheets—Sheet 3.

S. B. WORTMANN.
MECHANICAL MOVEMENT.

No. 468,167. Patented Feb. 2, 1892.

Witnesses:

Inventor:

(No Model.) 4 Sheets—Sheet 4.

S. B. WORTMANN.
MECHANICAL MOVEMENT.

No. 468,167. Patented Feb. 2, 1892.

Witnesses:

Inventor.

UNITED STATES PATENT OFFICE.

SIGISMUND B. WORTMANN, OF NEW YORK, N. Y.

MECHANICAL MOVEMENT.

SPECIFICATION forming part of Letters Patent No. 468,167, dated February 2, 1892.

Application filed November 24, 1891. Serial No. 412,913. (No model.)

*To all whom it may concern:*

Be it known that I, SIGISMUND B. WORTMANN, a citizen of the United States, residing at New York, in the county of New York and State of New York, have invented certain new and useful Improvements in Mechanical Movements; and I do hereby declare the following to be a full, clear, and exact description of the invention, such as will enable others skilled in the art to which it appertains to make and use the same.

The present invention is a mechanical movement in which are embodied the devices embraced in my prior patents issued to me October 27, 1891, and numbered 461,993 and 461,994, and in connection with the same. I employ mechanism by which a still further number of revolutions are attained by the axles and power-shaft on the uncoiling of the springs in proportion to the number of turns required to put the springs under tension, and thus prolong the period of time required for the unwinding of the springs.

In the inventions embraced in my prior patents just referred to I employ a single primary axle, a coiled spring, a drum which contains said spring and is loosely mounted on the axle, a shaft parallel with the axle, differential gearing on the axle and the counter-shaft and having its two primary wheels loose on the axle, one of said primary wheels being rigid with the drum, and an automatic clutch mechanism operating in connection with the differential gearing to free the axle from the influence of the spring when the spring-drum attains its maximum speed and is run down to such an extent that it fails to influence the drum and differential gearing, whereby I am enabled to obviate the breaking of the spring, cause the spring-drum, the axle, and the power-shaft to rotate in one direction at all times, both when putting the spring under tension and when it reacts and expends its power in driving the drum, axle, and power-shaft, and secure an increased number of rotations of the axle and shaft on the uncoiling of the spring as compared with the number of turns necessary to wind or put the spring under tension.

In my present invention I aim to secure the multiplied number of rotations of the axle and power-shaft as the springs uncoil to a still greater degree; and a further object is to partially rewind each spring of a series of springs at each turn of the power-shaft by temporarily arresting the uncoiling of each spring and utilizing the power of the acting springs of the series to partially rewind the spring so arrested, thus insuring a longer operation of the movement.

With these ends in view the invention consists in the combination, with a series of axles, (two or more,) each having a spring and a drum, a single power-shaft common to all the spring-axles, and differential gearing between the power-shaft and each spring-axle, of mechanism which temporarily arrests in succession each one of the spring-axles during a complete turn of the power-shaft and which permits the acting springs to partially rewind the spring on the axle so arrested.

The invention further consists in the combination of devices and novel construction and arrangement of parts, which will be hereinafter fully described and claimed.

The accompanying drawings fully illustrate my invention, in which—

Figure 2:
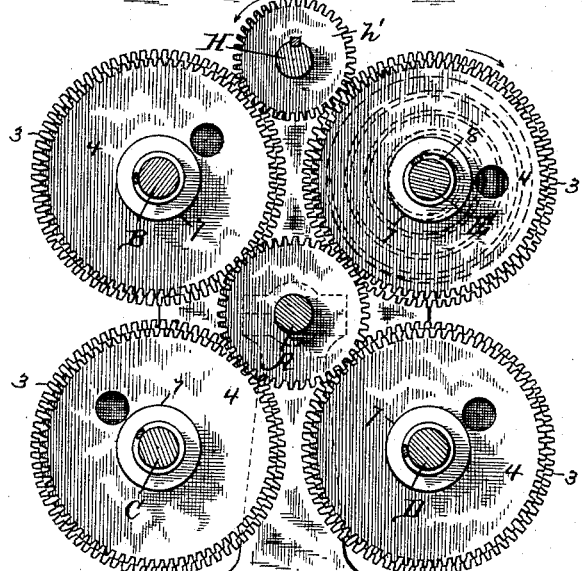
Figure 3:
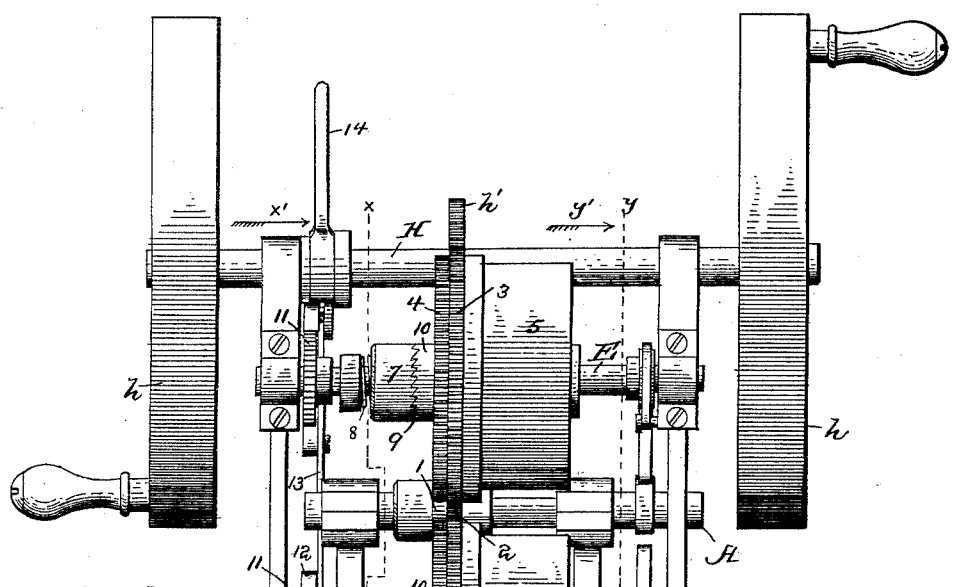
Figure 4:
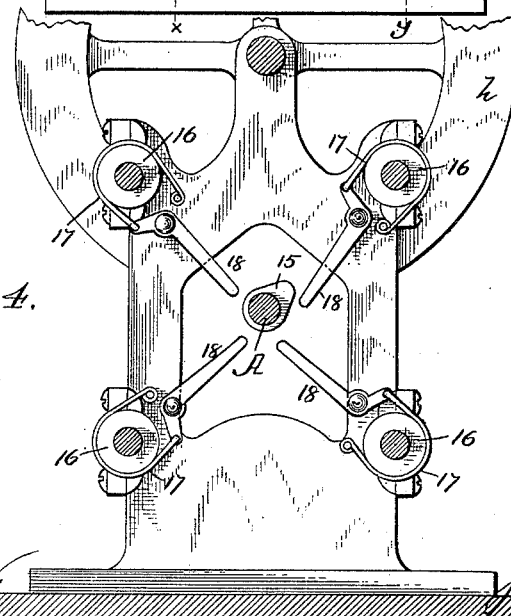
Figure 5:
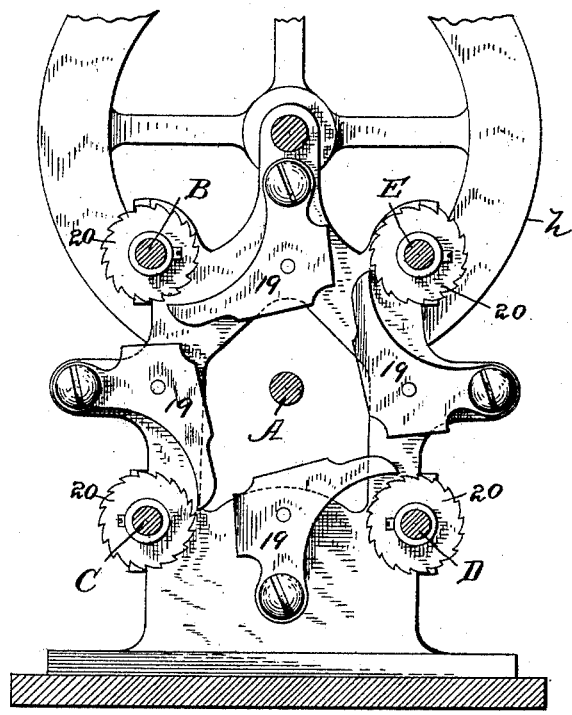
Figure 6:
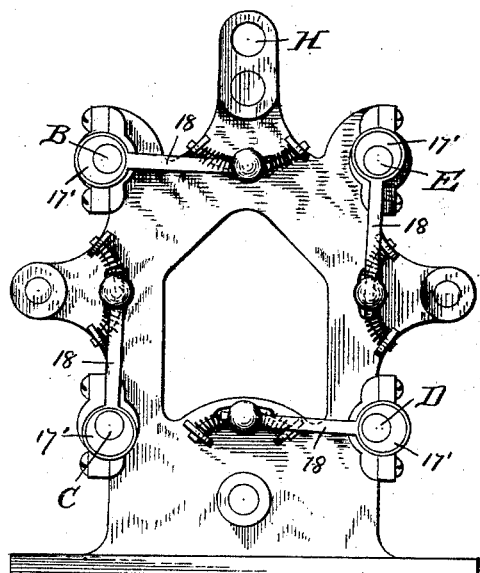
Figure 7:
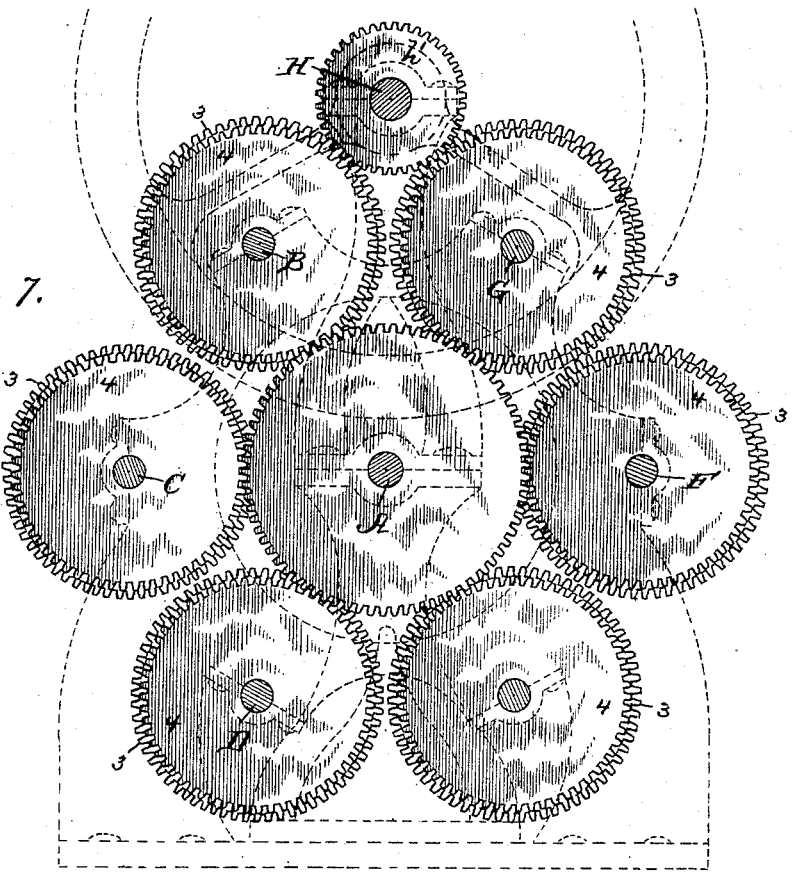
Figure 8:
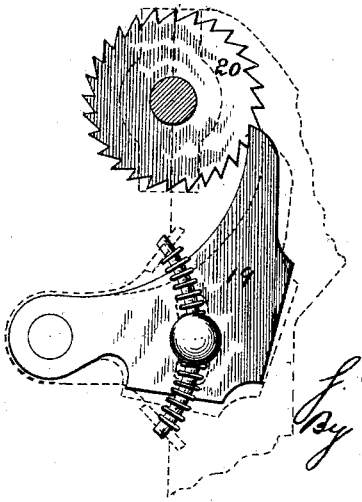

Figure 1 is a front view with one of the balance-wheels omitted and shown by dotted lines. Fig. 2 is a vertical transverse sectional view on the plane indicated by the dotted line $x\,x$ of Fig. 3 and looking in the direction indicated by the arrow $x'$. Fig. 3 is a side view of the movement shown in Figs. 1 and 2. Fig. 4 is a vertical section on the plane indicated by the dotted line $y\,y$ of Fig. 3 and looking in the direction indicated by the arrow $y'$. Fig. 5 is a sectional view similar to Fig. 4 and showing a modified form of mechanism for successively and temporarily arresting the motion of the spring-axles. Fig. 6 is a view of the mechanism shown in Fig. 5, looking in the reverse direction and showing the other side of the frame. Fig. 7 is a sectional view of the machine, illustrating a series of six axles and springs used in connection with a common power-shaft. Fig. 8 is an enlarged detail view of one of the pawls and ratchets employed in that form of the movement shown by Figs. 5 and 6.

Like letters and numerals of reference denote corresponding parts in all the figures of the drawings.

A designates the power-shaft, and B C D E are a series of spring-axles in Figs. 1 to 6, inclusive, and in Fig. 7 the spring-axles are designated at B C D E F G. Although the drawings illustrate my machines with four and six spring-axles, yet it is obvious that the number of axles and springs can be varied—as, for instance, two, three, five, or any desired number of axles and springs may be used, according to the power required for performing the work. The spring-axles are arranged in such relative positions to or around the power-shaft that the spring-axles can all be geared to the power-shaft which is common to all of said spring-axles. The power-shaft carries a compound gear comprising the members 1 2, which are of different relative diameters and contain a different number of teeth, and this compound gear forms, in connection with the primary gear-wheels 3 4 on each of the spring-axles, a differential gearing between each spring-axle and the power-shaft. Each spring-axle has a spring-drum 5, which is loosely mounted on the spring-axle, and within each drum is a coiled spring 6, having the inner end fastened to the spring-axle and its outer end fastened to the drum.

The primary gear-wheels 3 4 of the differential gearing are loose on the spring-axle and one of the primary wheels 3 is rigid with the spring-drum 5, so as to rotate therewith, while the other primary gear-wheel 4 of the differential gearing is adapted to be rigidly fastened to the spring-axle, when the spring uncoils, by an automatic clutch mechanism, one for each axle, and the loose primary gear 4. This automatic clutch mechanism in one embodiment of my invention consists of a sliding sleeve 7, keyed to the spring-axle and normally impelled by a coiled spring 8, as in my former patented movements, toward the gear-wheel 4, so that its serrated face or end 9 engages with a serrated hub 10 on the primary gear-wheel 4.

The series of springs can be readily wound in either of two ways—directly from the power-shaft A or from a winding-shaft H. If it is desired to wind from a separate winding-shaft, the power-shaft can terminate in its bearings and the winding-shaft H is provided in the upper part of the machine, said shaft H having the balance-wheels $h$ and a gear-pinion $h'$, arranged to mesh with the primary gear-wheels 3 3 of the upper drums. By turning the crank on the balance-wheel $h$ the shaft H and its pinion $h'$ will be rotated and turn the upper drums, which in turn will operate the compound pinion 1 2 on the power-shaft A and the latter will rotate the lower drums and spring-axles, thus winding all the springs by turning a single shaft.

By employing the differential gearing and arranging the same so that the gearing will turn the drums when winding the springs I am enabled to wind the springs from the outside of the same, because the drums are turned by the gearing, thus causing the drums to rotate in the same direction at all times, both when the machine is operated by hand or power to wind the springs and when the springs uncoil to expend their energy and drive the power-shaft.

To facilitate the operation of winding the springs I employ mechanism which engages with the spring-axles to hold them stationary or at rest while the spring-drums are being turned to place the springs under tension. This mechanism comprises a ratchet-wheel 11 on each of the spring-axles of the series and pawls 12, adapted for simultaneous engagement with all the ratchet-wheels of the series of spring-axles, said pawls being normally held away from the ratchet-wheels by a suitable arrangement of springs and all the pawls being controlled or operated from and by a single shipping-rod 13, which may for convenience be manipulated by a shipping-lever 14, suitably mounted or fulcrumed on the machine.

To wind the springs when the pawls are free of engagement with the ratchets on the spring-axles, the balance-wheel is turned in a direction the reverse of the direction of rotation of said wheel and the axles, and the axles, the drums, and the power-shaft all turn together; but when the shipping-lever is adjusted to throw the pawls into engagement with the ratchets the spring-axles are held stationary or fast, and to place the springs under tension the wheel can only be turned by hand in the same direction that it turns when the springs are uncoiling.

In order to secure a greater number of revolutions of the power-shaft and prolong the time that the movement will remain in operation, I employ mechanism, in connection with the spring-axles and the power-shaft, which operates to temporarily arrest the motion of each spring-axle in succession and while the other springs are acting, so that the springs so temporarily arrested will be partially rewound, say, the angular distance equivalent to a few of the teeth on the automatic clutch mechanism at each complete revolution of the power-shaft.

One embodiment of my invention consists in a cam or eccentric 15 on the power-shaft, a friction-disk 16 on each of the spring-axles, a friction band or hoop 17, arranged around the periphery of the friction-disk, and a lever or means 18, connected to the friction-brake 17 and arranged in the path of the cam or eccentric 15, so as to be moved by said cam when it contacts therewith to compress the friction-brake band around the friction-disk with sufficient power to arrest the rotation of the spring-axle for the short period of time that the cam is in engagement with the teeth. It is to be understood that the spring-axle is temporarily and positively stopped by its brake mechanism, so that a part of the power of the acting springs can be employed to partially rewind the spring thus arrested, and this is rendered possible owing to the fact that the spring can be wound without injury in either direction and that it can be placed under a greater degree of tension when its spring-axle is arrested, as hereinbefore explained. Thus when the springs are uncoiling and the power-shaft is driven by the same the eccentric first compresses the brake-band around the disks on the spring-axle B, thus arresting the axle B temporarily and permitting the spring thereon to be partially rewound the angular distance equivalent to a few of the teeth on the clutch, which automatically flies out of engagement with the gear 4, and when the cam passes the end of the lever the spring-band retracts the lever and the clutch instantly engages with the gear 4, thus bringing the spring again into action. The cam acts on the brake mechanism of the spring-axle C in like manner to arrest the same, permit its spring to be partially rewound and again brought into action, and the operations continued at each succeeding spring-axle until finally the power of all the springs is expended. This particular form of brake mechanism is not essential to this invention, and said brake mechanism can be of any form known or familiar to those skilled in the art. In Figs. 5 and 6 of the drawings I have illustrated another form of the mechanism for temporarily braking the spring-axles, and in this mechanism an eccentric 17' (or its equivalent) is fixed to one end of each shaft. A pitman 18 is connected to the eccentric and to a spring-pressed pawl 19, which is adapted to engage with the ratchet-wheel 20, fixed to or rigid with another of the spring-axles. Thus one spring-axle is adapted to be arrested by the crank or eccentric on an adjacent spring-axle, and each axle is thus in turn adapted to be arrested by another axle, the cranks or eccentrics being so arranged or disposed that only one spring-axle is arrested at a time and its spring partially rewound.

In Fig. 6 of the drawings I have shown a machine with a series of six springs around a common power-shaft, and this form of the machine is constructed with mechanism for holding the axles stationary when the springs are wound and with brake mechanism for successively arresting each spring-axle and partially rewinding each of its springs in the manner described. It is equally evident that any number of axles and springs may be used in connection with the brake mechanism and the winding mechanism, and the power of the movement can thus be varied to adapt it to the work required.

The operation of my invention will be understood by those skilled in the art from the foregoing description, taken in connection with the drawings, and it may be briefly summarized as follows: To place the springs under tension the balance-wheel can be turned in one direction to rotate the axles and shafts; but to facilitate the winding the shipping-rod can be moved to throw the pawls into engagement with the spring-axles to hold the same rigid, when the wheel can be turned in the reverse direction to quickly put the springs under tension. The pawls can be operated at any time to release the springs and permit them to uncoil to drive the power-shaft, and the shipping-lever can be moved at any time to arrest the drums without in any manner breaking or injuring the parts of the movement. When the springs are uncoiling, each brake mechanism is operated momentarily on each turn of the power-shaft to arrest the spring-axle and rewind to a limited extent the springs of the axle.

By varying the proportions of the wheels and the teeth thereof constituting the differential gearing, I am enabled to secure an increased number of rotations of the power-shaft. Another advantage secured is that of having the drums and spring-axles turn in one direction, both when winding or unwinding the springs, and by the present improvements I am enabled to still further increase the rotations of the power-shaft and prolong the operation of the machine.

I am aware that changes in the form and proportion of parts and details of construction may be made without departing from the spirit or sacrificing the advantages of my invention, and I therefore reserve the right to make such changes as fairly fall within the scope of the same.

Having thus fully described my invention, what I claim as new, and desire to secure by Letters Patent, is—

1. In a mechanical movement, the combination of the spring-axles, a common power-shaft, a spring and drum on each axle, differential gearing between each spring-drum and the power-shaft, and mechanism for temporarily arresting the rotation of the spring-axle and permit its spring to be rewound to a limited extent by the springs remaining in action, substantially as described.

2. In a mechanical movement, the combination of the spring-axles, a common power-shaft, a spring and drum on each spring-axle, differential gearing between each spring-axle and the power-shaft, an automatic clutch mechanism operating in connection with the differential gearing, and brake mechanism to hold one of the spring-axles temporarily at rest, substantially as described.

3. In a mechanical movement, the combination of a series of spring-axles, the springs and drums thereon, the power-shaft common to all the spring-axles, and differential gearings intermediate of the power-shaft and the spring-drums, substantially as described.

4. In a mechanical movement, the combination of a series of spring-axles, the springs and drums thereon, the differential gearings operating in connection with the spring-drums and the power-shaft, and an automatic clutch to free each spring-axle from the influence of its spring, substantially as described.

5. In a mechanical movement, the combination of the power-shaft, a series of spring-axles, the springs, spring-drums geared by differential gearing to the power-shaft, and mechanism for arresting the whole series of spring-axles, substantially as described.

6. In a mechanical movement, the combination, with the power-shaft, a series of spring-axles, the springs, spring-drums, differential gearing, and clutch mechanisms, of a series of connected pawls adapted to simultaneously engage with the spring-axles to hold them against rotation in one direction and a shipping rod or lever to adjust said pawls, substantially as described.

7. In a mechanical movement, the combination, with a series of spring-axles, a counter-shaft, springs, spring-drums, differential gearing, and clutches, of means for arresting the rotation of all the spring-axles and permitting the spring-drums to be turned while the axles are so held, thus permitting the springs to be wound from the power-shaft or from a separate winding-shaft, substantially as described.

8. In a mechanical movement, the combination, with a power-shaft, of a series of spring-axles, the springs, the drums geared by differential gearing to the power-shaft, a brake mechanism for each spring-axle, and means for successively operating each brake mechanism of the series of spring-axles for a limited period of time, substantially as described.

9. The combination, in a mechanical movement, with a power-shaft, of the spring-axles, the springs and drums, the differential gearing, brake mechanism for each spring-axle, and means on the power-shaft to operate each brake mechanism in succession, substantially as described.

10. In a mechanical movement of the class herein described, the combination, with the spring-axles and the springs thereon, of mechanism which retards the movement of each spring-axle in succession and permits the same to be partially rewound, substantially as described.

In testimony whereof I affix my signature in presence of two witnesses.

SIGISMUND B. WORTMANN.

Witnesses:
HENRY E. COOPER,
H. J. BERNHORS.